(12) United States Patent
Liu et al.

(10) Patent No.: US 11,996,008 B1
(45) Date of Patent: May 28, 2024

(54) METHOD, DEVICE, AND MEDIUM FOR DETERMINING PEAK POSITION OF LOWER EXTREMITY INJURY IN A CRASH TEST DUMMY

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Zhixin Liu, Tianjin (CN); Hanxiao Zhang, Tianjin (CN); Weidong Liu, Tianjin (CN); Yongqiang Wu, Tianjin (CN); Kai Wang, Tianjin (CN); Tianyi Hao, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 18/474,255

(22) Filed: Sep. 26, 2023

(30) Foreign Application Priority Data

Apr. 17, 2023 (CN) .......................... 202310401812.6

(51) Int. Cl.
*G09B 23/32* (2006.01)
*G01M 17/007* (2006.01)

(52) U.S. Cl.
CPC .......... *G09B 23/32* (2013.01); *G01M 17/0078* (2013.01)

(58) Field of Classification Search
CPC .. G09B 23/32; G01M 17/0078; B60R 21/205; B60R 21/01516; G06F 30/15
See application file for complete search history.

(56) References Cited

U.S. PATENT DOCUMENTS

| 5,629,809 | A | 5/1997 | Kurihara et al. |
| 6,907,391 | B2 | 6/2005 | Bellora et al. |

(Continued)

FOREIGN PATENT DOCUMENTS

| CN | 114910094 A | 8/2022 |
| CN | 115855424 A | 3/2023 |

*Primary Examiner* — Elias Desta
(74) *Attorney, Agent, or Firm* — True Shepherd LLC; Andrew C. Cheng (57) ABSTRACT

A method for determining a peak position of lower extremity injury in a crash test dummy includes: controlling the movement of the collision surface until the control point of the collision surface and the first designated collision point of the dummy's lower extremity form a line parallel to the direction of the vehicle acceleration, with a predetermined distance between the control point and the first designated collision point. A collision simulation calculation is performed to obtain the first tibial index curve, the first knee displacement curve, and the first thigh force curve. Similarly, the second designated collision point is used to obtain the second tibial index curve, the second knee displacement curve, and the second thigh force curve. Then, the injury values are calculated, and by comparing the injury values at different positions, the peak position is determined.

7 Claims, 7 Drawing Sheets

(56) References Cited

U.S. PATENT DOCUMENTS

| | | | |
|---|---|---|---|
| 7,758,069 B2 * | 7/2010 | Enders | B60R 21/01516 |
| | | | 280/732 |
| 7,832,762 B2 | 11/2010 | Breed et al. | |
| 8,219,365 B2 * | 7/2012 | Allen | G06F 30/15 |
| | | | 703/2 |
| 9,296,358 B2 * | 3/2016 | Chen | B60R 21/205 |

* cited by examiner

S1: controlling a movement of the collision surface until a control point of the collision surface and a first designated collision point on the lower extremity of the crash test dummy form a line parallel to a direction of the vehicle acceleration, with a predetermined distance between the control point and the first designated collision point; performing a collision simulation calculation to obtain a first tibia index curve, a first knee displacement curve, and a first thigh force curve S2: controlling the movement of the collision surface until the control point of the collision surface and a second designated collision point on the lower extremity of the crash test dummy form a line parallel to the direction of the vehicle acceleration, with a predetermined distance between the control point and the second designated collision point; performing the collision simulation calculation to obtain a second tibia index curve, a second knee displacement curve, and a second thigh force curve S3: determining a first injury data of the lower extremity of the crash test dummy at the first designated collision point using the first tibia index curve, the first knee displacement curve, and the first thigh force curve; and determining a second injury data of the lower extremity of the crash test dummy at the second designated collision point using the second tibia index curve, the second knee displacement curve, and the second thigh force curve S4: projecting a center point of an intersection between a knee and a shin of the lower extremity of the crash test dummy onto a line where a line segment L1 is located to obtain a first projection point of the center point, wherein the line segment L1 is formed by the first designated collision point and the second designated collision point S5: based on the first projection point, obtaining a first new collision point associated with the first collision point, and a second new collision associated with the second collision point S6: performing collision tests for the first and second new collision points respectively to obtain a third injury data associated with the first designated collision point and a fourth injury data associated with the second designated collision point S7: comparing the third injury data with the first injury data, and comparing the fourth injury data with the second injury data; updating the first designated collision point and the second designated collision point based on comparison results to determine the peak position of lower extremity injury in the crash test dummy

FIG. 7

METHOD, DEVICE, AND MEDIUM FOR DETERMINING PEAK POSITION OF LOWER EXTREMITY INJURY IN A CRASH TEST DUMMY

CROSS-REFERENCE TO RELATED APPLICATIONS

This application claims priority to Chinese Patent Application No. 202310401812.6 with a filing date of Apr. 17, 2023. The content of the aforementioned application, including any intervening amendments thereto, is incorporated herein by reference.

FIELD OF THE INVENTION

The present disclosure relates to the field of data processing, particularly to a method, device, and method for determining a peak position of lower extremity injuries in a crash test dummy.

BACKGROUND OF THE INVENTION

With the continuous development of the automotive industry and technology, the safety performance of vehicles has received increasing attention. Reducing the injuries to occupants caused by traffic accidents and improving the passive safety performance of automobiles have become key concerns and challenges for many automotive manufacturers.

During automotive collisions, the interaction between the knees, lower legs, and the dashboard can potentially cause lower extremity injury in human subjects. While these lower extremity injuries may not be life-threatening, they often result in high treatment costs, long recovery periods, and can sometimes lead to impaired physiological functions or disabilities for the occupants. Therefore, it is crucial to optimize the design of the dashboard shape and improve the internal structural layout to reduce the level of lower extremity injury in vehicle collisions. However, currently, there is no clear understanding of the relationship between the occurrence of lower extremity injury and the variation in the location of the first impact (the initial contact position between the crash test dummy and the dashboard). This lack of understanding makes it difficult to determine the most critical first impact position for lower extremity injury. Additionally, there is a lack of comprehensive evaluation indicators for lower extremity injury during the early design process, making it challenging to provide accurate comprehensive evaluations of lower extremity injury in crash test dummies and, consequently, propose optimal dashboard design and internal structural layout improvement solutions. Therefore, there is a need to develop a model and method for determining the peak position of lower extremity injury in crash test dummies.

In view of these considerations, the present disclosure is proposed.

SUMMARY OF THE INVENTION

To address the aforementioned technical issues, the present disclosure provides a method, device, and medium for determining the peak position of lower extremity injury in automotive crash test dummies. This disclosure enables the identification of the most vulnerable positions near the knees and lower legs of the crash test dummy, subsequently allowing for the optimization of the dashboard shape and the avoidance of this identified position in the internal rigid structural layout. By doing so, the severity of lower extremity injury in the crash test dummy is reduced, thereby enhancing the overall safety performance of automobiles.

The present disclosure provides a method for determining a peak position of lower extremity injury in a crash test dummy. The method includes the following:

The method is implemented using a predefined collision model. The predefined collision model comprises an automotive pedal, an automotive seat, a lower extremity of the crash test dummy, and a collision surface representing a dashboard area that first contacts the lower extremity of the crash test dummy during a simulated collision. The predefined collision model is subjected to gravitational acceleration and imparted with an initial velocity of 50 km/h during the collision test. Vehicle acceleration is applied to the automotive pedal, the automotive seat, and the collision surface. The method includes the following steps.

S1, controlling the movement of the collision surface until a control point of the collision surface and a first designated collision point on the lower extremity of the crash test dummy form a line parallel to the direction of the vehicle acceleration, with a predetermined distance between the control point and the first designated collision point; performing a collision simulation calculation to obtain a first tibia index curve, a first knee displacement curve, and a first thigh force curve.

S2, controlling the movement of the collision surface until the control point of the collision surface and a second designated collision point on the lower extremity of the crash test dummy form a line parallel to the direction of the vehicle acceleration, with a predetermined distance between the control point and the second designated collision point; performing a collision simulation calculation to obtain a second tibia index curve, a second knee displacement curve, and a second thigh force curve.

S3, determining a first injury data of the lower extremity of the crash test dummy at the first designated collision point using the first tibia index curve, the first knee displacement curve, and the first thigh force curve according to the following equation; and determining a second injury data of the lower extremity of the crash test dummy at the second designated collision point using the second tibia index curve, the second knee displacement curve, and the second thigh force curve according to the following equation;

$$DKII_j = \left[ \alpha \left| \frac{Kx(t)_j}{Kx_{bm}} \right| + \beta \left| \frac{Fz(t)_j}{Fz_{bm}} \right| + \gamma \left| \frac{TI(t)_j}{TI_{bm}} \right| \right]_{max}$$

where $Kx_{bm}$, $Fz_{bm}$, $TI_{bm}$, respectively, represents peak values of knee displacement curve, thigh force curve, and tibia index curve at a reference point; $Kx(t)_j$, $Fz(t)_j$, $TI(t)_j$, respectively, represents the knee displacement curve, thigh force curve, and tibia index curve at a collision point j; $\alpha$, $\beta$, and $\gamma$ represent weighting coefficients; $DKII_j$ represents injury data of the lower extremity of the crash test dummy at the collision point j.

S4, projecting a center point of an intersection between a knee and a shin of the lower extremity of the crash test dummy onto a line where a line segment L1 is located to obtain a first projection point of the center point, wherein the line segment L1 is formed by the first designated collision point and the second designated collision point.

S5, based on the first projection point, obtaining a first new collision point associated with the first collision point, and a second new collision associated with the second collision point.

S6, performing collision tests for the first and second new collision points respectively to obtain a third injury data associated with the first designated collision point and a fourth injury data associated with the second designated collision point.

S7, comparing the third injury data with the first injury data, and comparing the fourth injury data with the second injury data; updating the first designated collision point and the second designated collision point based on comparison results to determine the peak position of lower extremity injury in the crash test dummy.

Embodiments of the present disclosure provide an electronic device. The electronic device includes:

a processor and a memory.

The processor is configured to execute the steps of the method for determining a peak position of lower extremity injury in a crash test dummy according to any one of embodiments by invoking the program or instructions stored in the memory.

Embodiments of the present disclosure provide a computer-readable non-transitory storage medium. The computer-readable non-transitory storage medium stores a program or instructions that, when executed by a computer, cause the computer to perform the steps of the method for determining the peak position of lower extremity injury in a crash test dummy according to any one of embodiments.

The method for determining the peak position of lower extremity injury in a crash test dummy, as provided in the embodiments of the present disclosure, involves conducting collision tests at different positions on the dummy's lower extremity and calculating the corresponding injury data for each position. By comparing the injury data between different positions, the location near the knee and lower leg that is most susceptible to injury in the dummy is determined. Subsequently, the dashboard design in the vicinity of that location is optimized, and the internal rigid structural layout is arranged to avoid that specific area, thereby reducing the level of lower extremity injury in the crash test dummy and improving automotive safety performance. In the selection of different collision positions, projection techniques are applied, which enables the rapid identification of the most vulnerable location in the dummy's lower extremity, thus improving the efficiency of determination.

BRIEF DESCRIPTION OF THE DRAWINGS

In order to illustrate the specific embodiments of the present disclosure or the technical solutions in the prior art more clearly, the following briefly introduces the accompanying drawings that need to be used in the description of the specific embodiments or the prior art. Obviously, the accompanying drawings in the following description are some embodiments of the present disclosure. For those of ordinary skill in the art, other drawings can also be obtained based on these drawings without creative efforts.

FIG. 3 is a flow diagram showing the method for determining the peak position of lower extremity injury in a crash test dummy according to embodiments of the present disclosure;

DETAILED DESCRIPTION OF THE INVENTION

In order to make the objectives, technical solutions and advantages of the present disclosure clearer, the technical solutions of the present disclosure will be described clearly and completely below. Obviously, the described embodiments are only some, but not all, embodiments of the present disclosure. Based on the embodiments of the present disclosure, all other embodiments obtained by those of ordinary skill in the art without creative work fall within the protection scope of the present disclosure.

Figure 1:
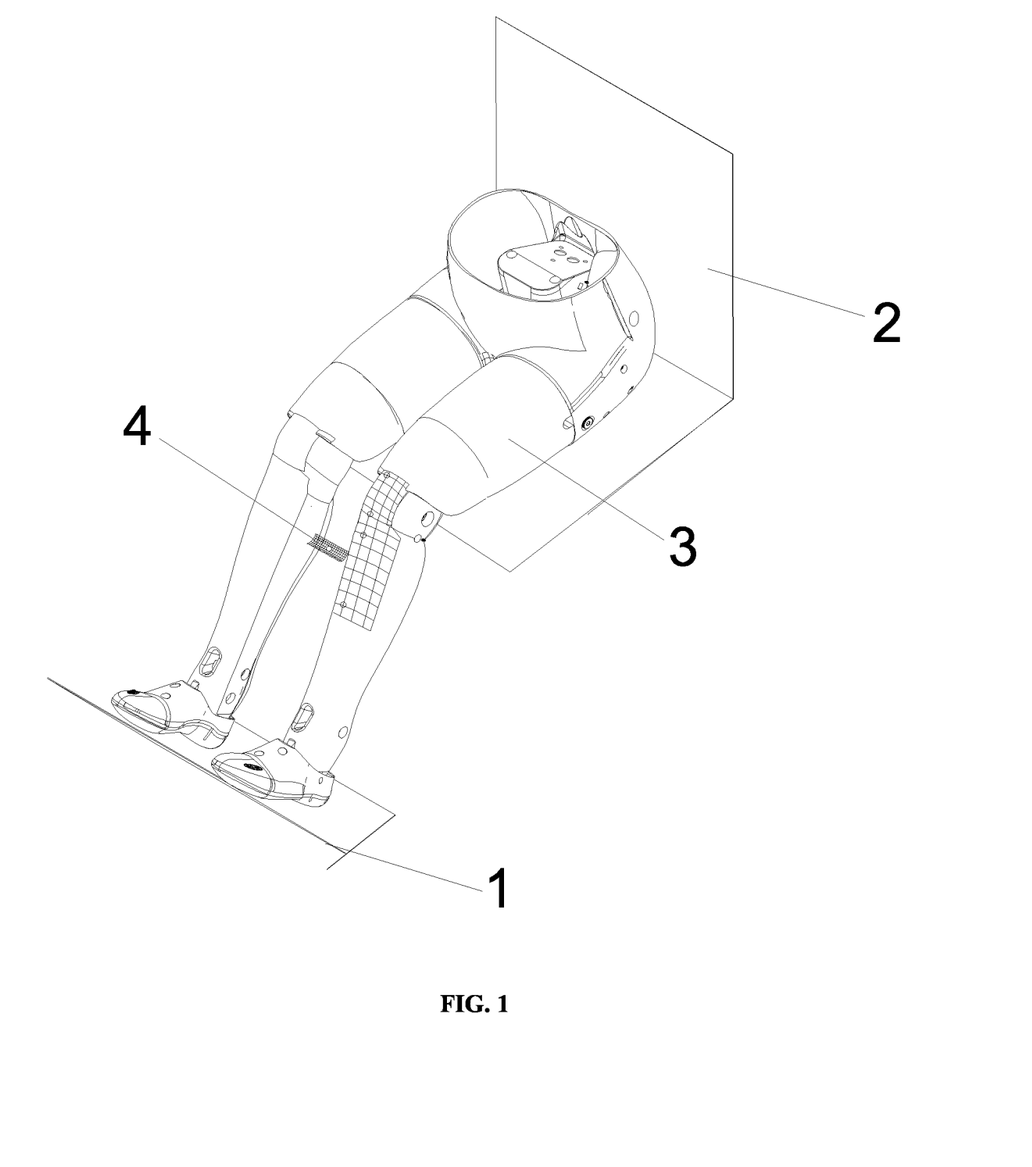
FIG. 1 is a schematic diagram of a predetermined collision model according to embodiments of the present disclosure.

Embodiments of the present disclosure provide a method for determining the peak position of the lower extremity injury in a crash test dummy, based on a predetermined collision model. Please refer to FIG. 1, the predetermined collision model includes an automotive pedal 1, an automotive seat 2, a lower extremity 3 of the crash test dummy, and a collision surface 4 simulating the area of the automotive dashboard that initially contacts the dummy's lower extremity 3 during a collision. In conducting the crash test, a gravitational acceleration is applied to the predetermined collision model, along with an initial velocity of 50 km/h. Additionally, the automotive pedal 1, automotive seat 2, and collision surface 4 are subjected to vehicle acceleration (which can be obtained from acceleration curves recorded during actual vehicle crash tests of other models). To enhance accuracy further, the relative position of the automotive pedal 1 and automotive seat 2 in the predetermined collision model is determined based on the relative position of the corresponding components in a vehicle undergoing dashboard design and internal structural layout. A grid with a size of 6 mm-8 mm is used to divide these components. Furthermore, the automotive pedal 1 and automotive seat 2 are assigned the same material and attribute parameters as the corresponding components in the vehicle undergoing dashboard design and internal structural layout. The positioning of the crash test dummy follows the C-NCAP (China-New Car Assessment Program) regulations, with only the dummy's lower extremity 3 being retained. The dummy's lower extremity 3 is a simulated model consisting of the pelvis, thigh, knee, lower leg, ankle joint, and foot. The positioning of the dummy's lower extremity 3 in relation to the automotive pedal 1 and automotive seat 2 follows the C-NCAP regulation, physical dummy model for the positioning of the lower extremity in real vehicle crash tests. A grid with a size of 6 mm-8 mm is used to segment the collision surface 4, and it is assigned basic parameters such as material and attributes that are the same as those undergoing dashboard design. Contact interactions are established between the dummy's lower extremity 3 and the automotive pedal 1, the automotive seat 2, and the collision surface 4 respectively.

Figure 2:
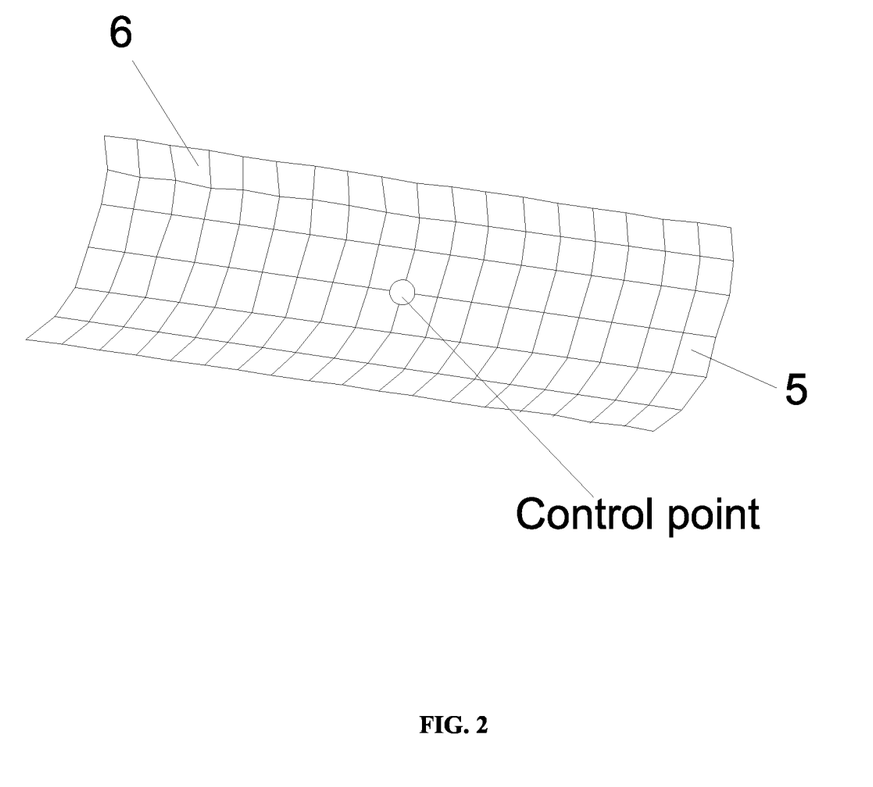
FIG. 2 is a schematic diagram of a collision surface according to embodiments of the present disclosure.

Referring to FIG. 2, the collision surface 4 consists of two components: a dashboard-shaped collision surface 5 with smaller curvature, and a transitional surface 6 with larger curvature. The dashboard-shaped collision surface 5 simulates the area in the dashboard that initially contacts the lower extremity during a collision, while the transitional surface 6 ensures a smooth transition within the collision surface. The control point of the collision surface 4 is defined as the center point of the dashboard-shaped collision surface 5.

Based on the aforementioned predetermined collision model, please refer to FIG. 3, the method for determining the peak position of lower extremity injury in a crash test dummy includes the following steps:

S1, controlling the movement of the collision surface 4 until a control point of the collision surface 4 and a first designated collision point on the lower extremity 3 of the crash test dummy form a line parallel to the direction of the vehicle acceleration, with a predetermined distance between the control point and the first designated collision point; performing a collision simulation calculation to obtain a first tibia index curve, a first knee displacement curve, and a first thigh force curve.

S2, controlling the movement of the collision surface 4 until the control point of the collision surface 4 and a second designated collision point on the lower extremity 3 of the crash test dummy form a line parallel to the direction of the vehicle acceleration, with a predetermined distance between the control point and the second designated collision point; performing a collision simulation calculation to obtain a second tibia index curve, a second knee displacement curve, and a second thigh force curve.

The first and second designated collision points are preselected positions. As an illustrative example, referring to FIG. 4, the first designated collision point 410 is a point on the upper surface of the dummy's knee, and the second designated collision point 420 is a point on the outer surface of the middle region of the dummy's lower leg. The predetermined distance can range between 78 mm and 82 mm, and the specific value can be determined based on the dimensions of the collision surface 4.

The tibial index curve TI(t) is determined based on the data collected from sensors placed at the upper end of the tibia. It represents the following:

$$TI(t) = \frac{F(t)}{Fc} + \frac{M(t)}{Mc}$$

where F(t) represents the tibial compression force curve obtained from the sensor measurements. $F_C$ is the critical value for tibial compression force, set at 35.9 kN. The resultant bending moment $M(t)=\sqrt{M_x(t)^2+M_y(t)^2}$, the bending moment curve in the x-direction is denoted as $M_x(t)$, while the bending moment curve in the y-direction is denoted as $M_y(t)$. Mc represents the critical value for the combined bending moment, set at 225 N·m. S3, determining a first injury data of the lower extremity of the crash test dummy at the first designated collision point using the first tibia index curve, the first knee displacement curve, and the first thigh force curve according to the following equation; and determining a second injury data of the lower extremity 3 of the crash test dummy at the second designated collision point using the second tibia index curve, the second knee displacement curve, and the second thigh force curve according to the following equation;

$$DKII_j = \left[\alpha\left|\frac{Kx(t)_j}{Kx_{bm}}\right| + \beta\left|\frac{Fz(t)_j}{Fz_{bm}}\right| + \gamma\left|\frac{TI(t)_j}{TI_{bm}}\right|\right]_{max}$$

where $Kx_{bm}$, $Fz_{bm}$, $TI_{bm}$, respectively, represents peak values of knee displacement curve, thigh force curve, and tibia index curve at a reference point; $Kx(t)_j$, $Fz(t)_j$, $TI(t)_j$, respectively, represents the knee displacement curve, thigh force curve, and tibia index curve at a collision point j; $\alpha$, $\beta$, and $\gamma$ represent weighting coefficients; $DKII_j$ represents injury data of the lower extremity of the crash test dummy at collision point j.

The aforementioned approach for calculating injury data reflects the comprehensive damage inflicted on the dummy's lower extremity when the dashboard collides with them. Specifically, impacting the dummy's knee with the dashboard has a significant impact on the damage value of the thigh force, while impacting the lower leg of the crash test dummy has a significant influence on the knee displacement and tibial index.

The aforementioned reference collision point can be either the first designated collision point or the second designated collision point, or it can be a different point altogether, distinct from both the first and second designated collision points. When calculating the first injury data, collision point j corresponds specifically to the first designated collision point, whereas when calculating the second injury data, collision point j corresponds specifically to the second designated collision point.

S4, projecting a center point of an intersection between a knee and a shin of the lower extremity 3 of the crash test dummy onto a line where a line segment L1 is located to obtain a first projection point of the center point, wherein the line segment L1 is formed by the first designated collision point and the second designated collision point.

Figure 4:
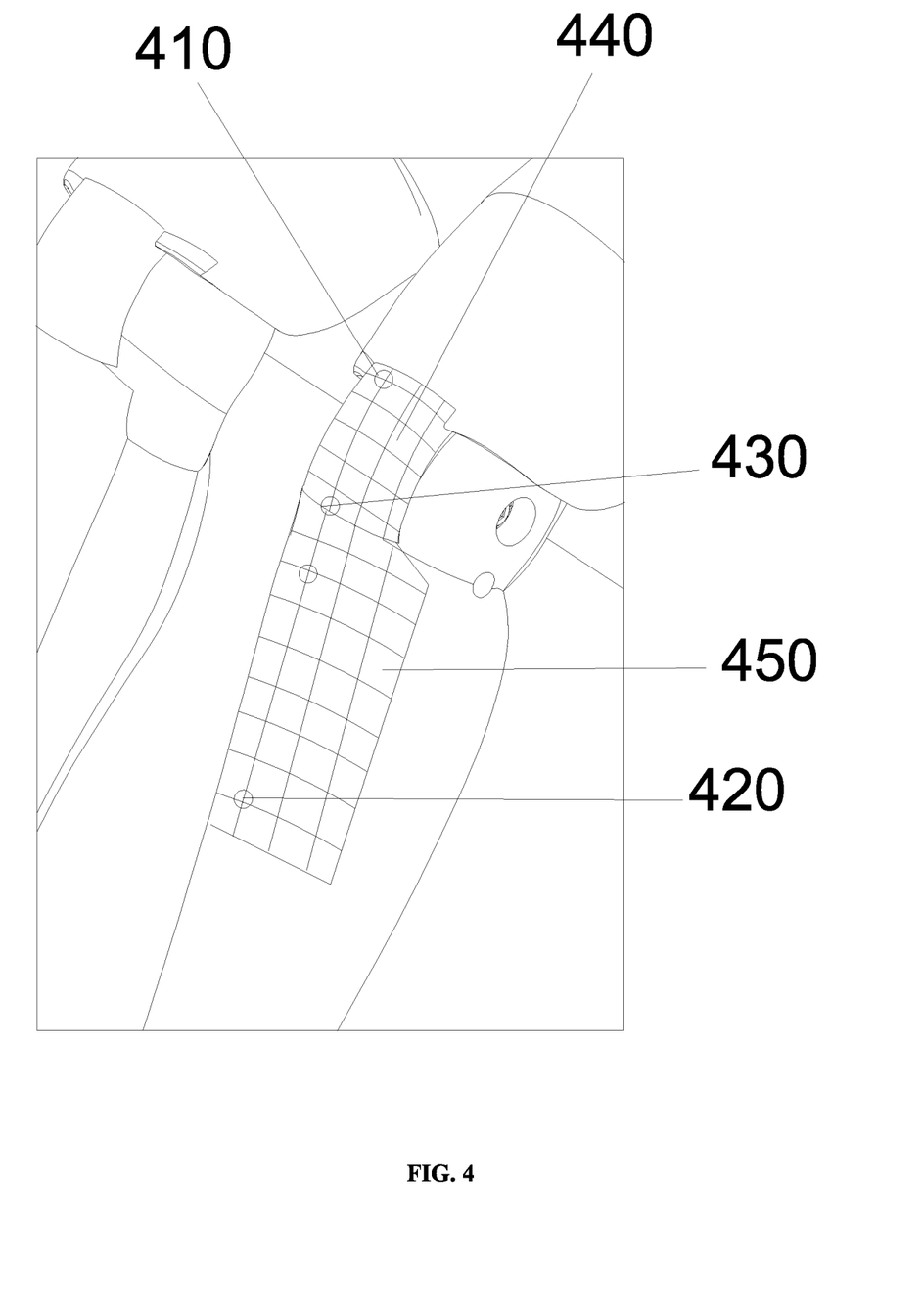
FIG. 4 is a schematic diagram of a dummy's lower extremity according to embodiments of the present disclosure.
Figure 5:
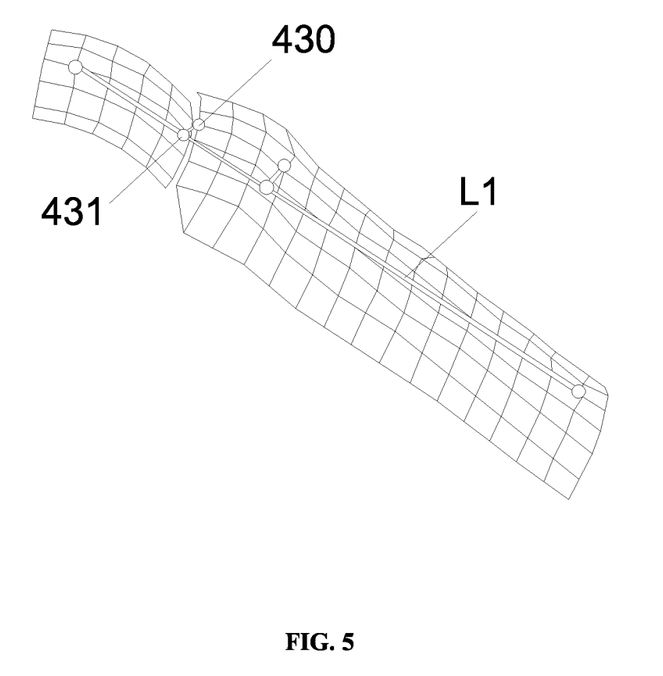
FIG. 5 is a schematic diagram showing point projections based on the dummy's lower extremity according to embodiments of the present disclosure.

Referring to FIG. 4, the center point 430 of the intersection between the knee and lower leg of the dummy's lower extremity 3 is located. The center point 430 is projected onto the straight line where line segment L1 lies, resulting in the first projection point 431, as illustrated in FIG. 5.

S5, based on the first projection point, obtaining a first new collision point associated with the first collision point, and a second new collision associated with the second collision point.

As an illustrative example, step S5 includes the following steps: S51-S54.

S51, determining the coordinate ($x_5$, $y_5$, $z_5$) of the first segmentation point, and the coordinate ($x_6$, $y_6$, $z_6$) of the second segmentation point.

$$x_5 = x_2 + \eta(x_1 - x_2);$$
$$y_5 = y_2 + \eta(y_1 - y_2);$$
$$z_5 = z_2 + \eta(z_1 - z_2);$$
$$x_6 = x_2 + (1-\eta)(x_1 - x_2);$$
$$y_6 = y_2 + (1-\eta)(y_1 - y_2);$$
$$z_6 = z_2 + (1-\eta)(z_1 - z_2);$$

where η represents a preset coefficient, which is taken within a range of 0.6-0.65. This method for calculating the segmentation points ensures that each iteration selects the segmentation point in a proportion of u and 1-u, making it simple and efficient.

S52, determining whether the first segmentation point is located between the first designated collision point and the first projection point. If yes, the first segmentation point is projected onto the knee region of the dummy's lower extremity 3. Otherwise, the first segmentation point is projected onto the lower leg region of the dummy's lower extremity 3 to obtain the second projection point for the first segmentation point.

S53, determining whether the second segmentation point is located between the first designated collision point and the first projection point. If yes, the second segmentation point is projected onto the knee region of the dummy's lower extremity 3. Otherwise, the second segmentation point is projected onto the lower leg region of the dummy's lower extremity 3 to obtain a third projection point for the second segmentation point.

Referring to FIG. 4, the knee region refers to the surface area 440 generated by the mesh of the outer skin area around the knee. The lower leg region refers to the surface area 450 generated by the mesh of the middle and upper portions of the outer skin surface of the dummy's lower leg in the positive X direction.

Figure 6:
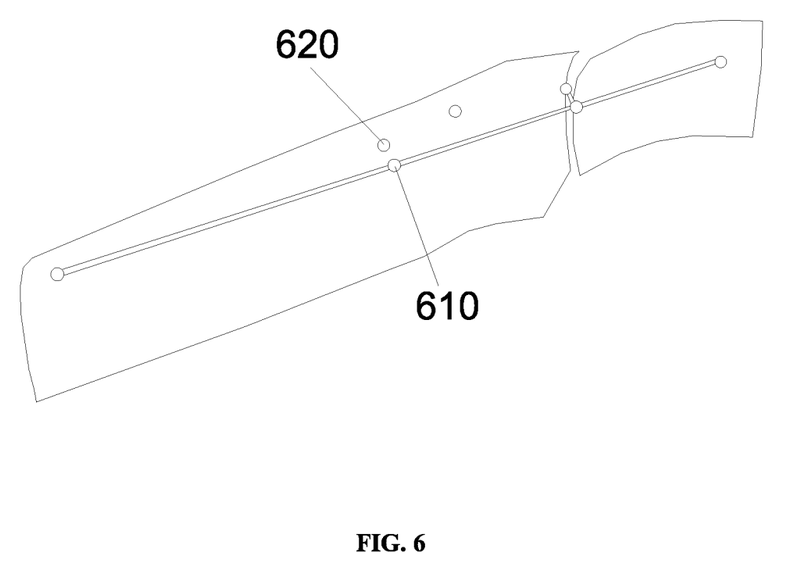
FIG. 6 is another schematic diagram showing point projections based on the dummy's lower extremity according to embodiments of the present disclosure.

As an illustrative example, referring to FIG. 6, label 610 represents one segmentation point, and label 620 represents the projection point obtained by projecting the segmentation point 610 onto the lower leg region.

S54, determining the second projection point as the first new collision point associated with the first designated collision point, and determining the third projection point as the second new collision point associated with the second designated collision point.

Specifically, determining the second projection point as the first new collision point associated with the first designated collision point means that the second projection point is closer to the first designated collision point than the second designated collision point. Similarly, the third projection point is closer to the second designated collision point than the first designated collision point. Therefore, the third projection point is determined to be the second new collision point associated with the second designated collision point.

S6, performing collision tests for the first and second new collision points respectively to obtain a third injury data associated with the first designated collision point and a fourth injury data associated with the second designated collision point.

Specifically, the process of conducting collision testing for the second projection point is similar to Step S1, with the exception that the first designated collision point is replaced by the second projection point. The collision surface 4 is controlled to move until the line formed by the control point of the collision surface 4 and the second projection point is parallel to the direction of vehicle acceleration, with a predetermined distance between the control point and the second projection point. At this point, collision simulation calculations are performed to obtain the corresponding tibial index curve, knee displacement curve, and thigh force curve. Based on these curves, the corresponding injury data is determined, which represents the third injury data associated with the first designated collision point.

Exemplarily, the step S6 includes the following steps S61-62.

S61, conducting collision test for the second projection point to obtain the third injury data associated with the first designated collision point.

S62, conducting collision test for the third projection point to obtain the fourth injury data associated with the second designated collision point.

S7, comparing the third injury data with the first injury data, and comparing the fourth injury data with the second injury data; updating the first designated collision point and the second designated collision point based on the comparison results to determine the peak position of lower extremity injury in the crash test dummy.

Exemplarily, the step S7 includes the following steps S71-73.

S71, if the third injury data is smaller than the first injury data, and the fourth injury data is smaller than the second injury data, determining a larger one between the first injury data and the second injury data, and defining the collision point associated with the larger one as a peak position of lower extremity injury in the crash test dummy.

S72, if the third injury data is greater than the first injury data, updating the coordinate of the first designated collision point with the coordinate of the second projection point, and updating the first injury data with the third injury data; if the fourth injury data is greater than the second injury data, updating the coordinate of the second designated collision point with the coordinate of the third projection point, and updating the second injury data with the fourth injury data;

S73, repeating steps S4 to S7 for the updated first designated collision point and/or the updated second designated collision point; continuing the iterative process until the required accuracy is achieved, then exiting the iterative process.

Specifically, the accuracy requirement can be a distance between the first designated collision point and the second designated collision point is smaller than a distance threshold after updating the collision points.

Exemplarily, let the initial damage data be denoted as $DKII_1$, the second damage data as $DKII_2$, the third damage data as $DKII_3$, and the fourth damage data as $DKII_4$. If $DKII_3$ is greater than $DKII_1$, assigning the value of $DKII_3$ to $DKII_1$ and updating the coordinate of the first designated collision point to the coordinate of the second projection point. If $DKII_4$ is greater than $DKII_2$, assigning the value of $DKII_4$ to $DKII_2$ and updating the coordinate of the second designated collision point to the coordinate of the third projection point. Repeat the aforementioned steps S4 to S7 for the updated first designated collision point and the updated second designated collision point, thereby obtaining new damage data. Continue comparing this new damage data with $DKII_1$ and $DKII_2$ in terms of magnitude. Iterate in this manner until the desired level of accuracy is achieved, upon which the process can be concluded. Should the iterative process yield $DKII_3$ being smaller than $DKII_1$ and $DKII_4$ being smaller than $DKII_2$, then ascertain the position of the collision point corresponding to the larger one between $DKII_1$ and $DKII_2$ as the peak position of lower extremity injuries in automotive collisions. This position signifies the most vulnerable area of the lower extremity, or rather, the most disadvantageous collision point for the lower extremity. Subsequently, optimize the design of the dashboard near this location to ensure that the internal layout of rigid structures avoids this area as much as possible, effectively reducing the damage caused by the dashboard to the lower extremity during automotive collisions and enhancing the level of dashboard design proficiency.

The technical solution provided by the embodiments of the present disclosure comprehensively considers the damage to the critical regions of the lower extremity of the crash test dummy. By integrating the projection method, it enables rapid determination of the collision position corresponding to the peak lower extremity injury.

Figure 7:
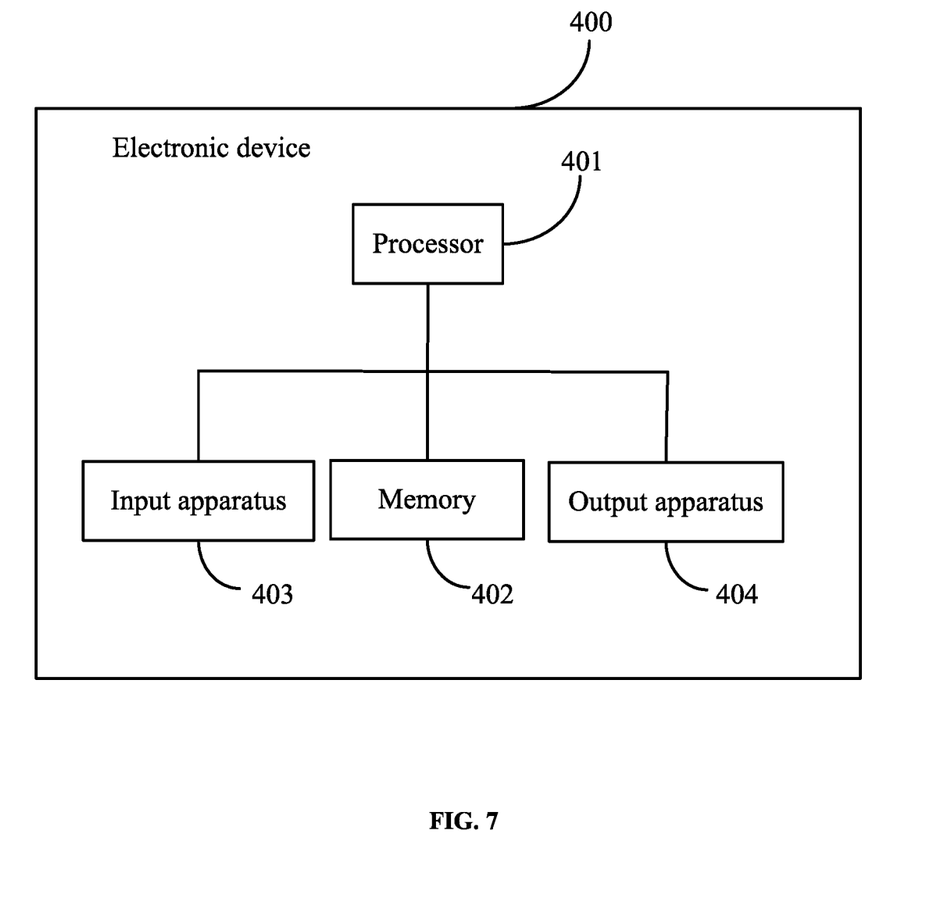
FIG. 7 is a schematic diagram of an electronic device according to embodiments of the present disclosure.

FIG. 7 illustrates a schematic diagram of an electronic device according to embodiments of the present disclosure. As shown in FIG. 7, the electronic device 400 includes one or more processors 401 and a memory 402.

The processor 401 can be a central processing unit (CPU) or any other form of processing unit with data processing and/or instruction execution capabilities. It has the ability to control other components within the electronic device 400 to perform desired functions.

The memory 402 may include one or more computer program products, which can encompass various forms of computer-readable storage media, such as volatile memory and/or non-volatile memory. Examples of volatile memory include random-access memory (RAM) and high-speed cache memory. Examples of non-volatile memory include read-only memory (ROM), hard drives, flash memory, and so forth. The computer-readable storage media can store one or more computer program instructions, which can be executed by the processor 401 to implement the method for determining the peak position of lower extremity injury in automotive collisions, as described in the preceding text, or any other desired functionalities. The computer-readable storage media can also store various contents such as initial parameters and thresholds.

In one example, the electronic device 400 may further include input apparatus 403 and output apparatus 404, which are interconnected via a bus system and/or other forms of connection mechanisms (not shown). The input apparatus 403 may include apparatus like keyboards, mice, and so on. The output apparatus 404 may convey various information to the external environment, including warning messages and braking force, among others. Examples of output apparatus include displays, speakers, printers, communication networks, and remotely connected output apparatus.

Of course, for the sake of simplicity, FIG. 7 only illustrates some components related to the present disclosure within the electronic device 400, while omitting components such as buses and input/output interfaces. Additionally, depending on specific application scenarios, the electronic device 400 may include other appropriate components.

In addition to the aforementioned methods and devices, embodiments of the present disclosure may also include a computer program product comprising computer program instructions. These instructions, when executed by a processor, enable the processor to perform the steps of the method for determining the peak position of lower extremity injury in an automotive collision crash test dummy, as provided in any embodiment of the present disclosure.

The computer program product can be written in one or more programming languages, including object-oriented programming languages such as Java or C++, as well as conventional procedural programming languages like "C" or similar languages. The program code can be executed entirely on a user's computing device, partially on a user's device, as a standalone software package, partially on the user's computing device and partially on a remote computing device, or entirely on a remote computing device or server.

Furthermore, embodiments of the present disclosure may also include a computer-readable storage medium that stores computer program instructions. These instructions, when executed by a processor, enable the processor to perform the steps of the method for determining the peak position of lower extremity injury in a crash test dummy, as provided in any embodiment of the present disclosure.

The computer-readable storage medium can be a combination of one or more readable media. Readable media can include signal media or storage media. Examples of storage media include, but are not limited to, systems, devices, or apparatuses employing electrical, magnetic, optical, electromagnetic, infrared, or semiconductor systems, devices, or elements, or any combination thereof. Specific examples (non-exhaustive) of the storage media include electrically connected media with one or more wires, portable disks, hard disks, random access memory (RAM), read-only memory (ROM), erasable programmable read-only memory (EPROM or flash memory), optical fibers, portable compact disk read-only memory (CD-ROM), optical memory devices, magnetic memory devices, or any suitable combination thereof.

It should be noted that the terms used in the present disclosure are used to describe specific embodiments and do not limit the scope of the claims. As shown in this specification, unless otherwise explicitly indicated by the context, terms such as "one," "a," "an," and/or "the" are not specifically limited to singular form and may include plural forms. The terms "comprise," "including," or any other variations thereof, are intended to cover non-exclusive inclusion, such that a process, method, or device that includes a series of elements encompasses not only those elements explicitly listed but also additional elements not explicitly listed or inherent to such process, method, or device. In the absence of further limitations, the use of the phrase "comprising a . . . " to describe an element does not exclude the presence of other identical elements in a process, method, or device that includes the described element.

Furthermore, it should be clarified that terms such as "center," "upper," "lower," "left," "right," "vertical," "horizontal," "inside," "outside," and similar directional or positional relationships are based on the orientations or positions shown in the drawings for the purpose of describing the present disclosure and simplifying the description. They do not indicate or imply that the devices or components referred to must have specific orientations, be constructed or operated in specific orientations. Therefore, they should not be understood as limitations to the present disclosure. Unless otherwise specified and limited, terms such as "mount," "connect," "attach," and the like should be broadly interpreted. For example, they can refer to fixed connections, detachable connections, or integral connections; mechanical connections or electrical connections; direct connections or indirect connections through intermediate media; or connections within two components. Those skilled in the art can understand the specific meanings of these terms in the context of the present disclosure.

Finally, it should be noted that the above embodiments are provided for the purpose of illustrating the technical solutions of the present disclosure and are not intended to limit the scope thereof. Although detailed descriptions have been provided with reference to the aforementioned embodiments, those skilled in the art should understand that modifications can be made to the technical solutions described in the aforementioned embodiments, or equivalent replacements can be made to some or all of the technical features. Such modifications or replacements do not depart from the essence of the technical solutions of the various embodiments of the present disclosure.

What is claimed is:

1. A method for determining a peak position of lower extremity injury in a crash test dummy, wherein the method is implemented using a predefined collision model; the predefined collision model comprises an automotive pedal (1), an automotive seat (2), a lower extremity (3) of the crash test dummy, and a collision surface (4) for simulating a dashboard area that first contacts the lower extremity of the crash test dummy during a collision; the predefined collision model is subjected to gravitational acceleration and imparted with an initial velocity of 50 km/h during a collision test; and vehicle acceleration is applied to the automotive pedal (1), the automotive seat (2), and the collision surface (4); the method comprises the following steps:

S1, controlling a movement of the collision surface (4) until a control point of the collision surface (4) and a first designated collision point on the lower extremity (3) of the crash test dummy form a line parallel to a direction of the vehicle acceleration, with a predetermined distance between the control point and the first designated collision point; performing a collision simulation calculation to obtain a first tibia index curve, a first knee displacement curve, and a first thigh force curve;

S2, controlling the movement of the collision surface (4) until the control point of the collision surface (4) and a second designated collision point on the lower extremity (3) of the crash test dummy form a line parallel to the direction of the vehicle acceleration, with a predetermined distance between the control point and the second designated collision point; performing the collision simulation calculation to obtain a second tibia index curve, a second knee displacement curve, and a second thigh force curve;

S3, determining a first injury data of the lower extremity (3) of the crash test dummy at the first designated collision point using the first tibia index curve, the first knee displacement curve, and the first thigh force curve according to the following equation; and determining a second injury data of the lower extremity (3) of the crash test dummy at the second designated collision point using the second tibia index curve, the second knee displacement curve, and the second thigh force curve according to the following equation:

$$DKII_j = \left[\alpha \left|\frac{Kx(t)_j}{Kx_{bm}}\right| + \beta \left|\frac{Fz(t)_j}{Fz_{bm}}\right| + \gamma \left|\frac{TI(t)_j}{TI_{bm}}\right|\right]_{max}$$

wherein, $Kx_{bm}$, $Fz_{bm}$, $TI_{bm}$, respectively, represents peak values of knee displacement curve, thigh force curve, and tibia index curve at a reference point; $Kx(t)_j$, $Fz(t)_j$, $TI(t)_j$, respectively, represents the knee displacement curve, thigh force curve, and tibia index curve at a collision point j; $\alpha$, $\beta$, and $\gamma$ represent weighting coefficients; $DKII_j$ represents injury data of the lower extremity of the crash test dummy at the collision point j;

S4, projecting a center point of an intersection between a knee and a shin of the lower extremity (3) of the crash test dummy onto a line where a line segment L1 is located to obtain a first projection point of the center point, wherein the line segment L1 is formed by the first designated collision point and the second designated collision point;

S5, based on the first projection point, obtaining a first new collision point associated with the first collision point, and a second new collision associated with the second collision point;

S6, performing collision tests for the first and second new collision points respectively to obtain a third injury data associated with the first designated collision point and a fourth injury data associated with the second designated collision point; and S7, comparing the third injury data with the first injury data, and comparing the fourth injury data with the second injury data; updating the first designated collision point and the second designated collision point based on comparison results to determine the peak position of lower extremity injury in the crash test dummy.

2. The method according to claim 1, wherein the obtaining the first new collision point associated with the first collision point and the second new collision associated with the second collision point based on the projection point, comprises:

S51, determining a coordinate ($x_5$, $y_5$, $z_5$) of a first segmentation point of the line segment L1, and a coordinate ($x_6$, $y_6$, $z_6$) of a second segmentation point of the line segment L1 based on the following equations:

$$x_5 = x_2 + \eta(x_1 - x_2);$$
$$y_5 = y_2 + \eta(y_1 - y_2);$$
$$z_5 = z_2 + \eta(z_1 - z_2);$$
$$x_6 = x_2 + (1 - \eta)(x_1 - x_2);$$
$$y_6 = y_2 + (1 - \eta)(y_1 - y_2);$$
$$z_6 = z_2 + (1 - \eta)(z_1 - z_2);$$

wherein, $\eta$ is a predetermined coefficient in a range between 0.6 and 0.65;

S52, determine whether the first segmentation point lies between the first designated collision point and the first projection point; if yes, projecting the first segmentation point onto a knee region of the lower extremity (3) of the crash test dummy; otherwise, projecting the first segmentation point onto a calf region of the lower extremity (3) of the crash test dummy to obtain a second projection point of the first segmentation point;

S53, determining whether the second segmentation point lies between the first designated collision point and the first projection point; if yes, projecting the second segmentation point onto the knee region of the lower extremity (3) of the crash test dummy; otherwise, projecting the second segmentation point onto the calf region of the lower extremity (3) of the crash test dummy to obtain a third projection point of the second segmentation point; and S54, determining the second projection point as the first new collision point associated with the first designated collision point, and determining the third projection point as the second new collision point associated with the second designated collision point.

3. The method according to claim 2, wherein the performing collision tests for the first and second new collision points respectively to obtain the third injury data associated with the first designated collision point and the fourth injury data associated with the second designated collision point, comprises:
- S61, conducting a collision test for the second projection point to obtain the third injury data associated with the first designated collision point; and
- S62, conducting a collision test for the third projection point to obtain the fourth injury data associated with the second designated collision point.

4. The method according to claim 2, wherein the comparing the third injury data with the first injury data, and comparing the fourth injury data with the second injury data; updating the first designated collision point and the second designated collision point based on the comparison results to determine the peak position of lower extremity injury in the crash test dummy, comprises:
- S71, if the third injury data is smaller than the first injury data, and the fourth injury data is smaller than the second injury data, determining a larger one between the first injury data and the second injury data, and defining the collision point associated with the larger one as the peak position of lower extremity injury in the crash test dummy;
- S72, if the third injury data is greater than the first injury data, updating the coordinate of the first designated collision point with the coordinate of the second projection point, and updating the first injury data with the third injury data; if the fourth injury data is greater than the second injury data, updating the coordinate of the second designated collision point with the coordinate of the third projection point, and updating the second injury data with the fourth injury data;
- S73, repeating steps S4 to S7 for the updated first designated collision point and/or the updated second designated collision point; continuing an iterative process until a required accuracy is achieved, then exiting the iterative process.

5. The method according to claim 1, wherein a relative position between the automotive pedal (1) and the automotive seat (2) in the predetermined collision model is determined based on a relative position between a pedal and a seat in a vehicle intended for dashboard design and internal structural layout; and the automotive pedal (1) and the automotive seat (2) are assigned same materials and attribute parameters as corresponding components in the vehicle intended for dashboard design and internal structural layout; the crash test dummy is placed according to guidelines of C-NCAP (China-New Car Assessment Program) regulations; once placement is completed, only the lower extremity of the dummy (3) is retained.

6. An electronic device, comprising:
a processor and a memory;
wherein the processor is configured to execute the steps of the method according to claim 1 by invoking a program or instructions stored in the memory.

7. A computer-readable non-transitory storage medium, wherein the computer-readable non-transitory storage medium stores a program or instructions that, when executed by a computer, cause the computer to perform the steps of the method according to claim 1.

* * * * *